United States Patent
Zanzig et al.

(10) Patent No.: US 6,998,448 B2
(45) Date of Patent: Feb. 14, 2006

(54) TIRE WITH TREAD OF CIS 1,4-POLYBUTADIENE RICH RUBBER COMPOSITION WHICH CONTAINS A FUNCTIONAL STYRENE/BUTADIENE ELASTOMER, SILICA AND COUPLING AGENT

(75) Inventors: David John Zanzig, Bertrange (LU); Georges Marcel Victor Thielen, Schouweiler (LU); Jennifer Ann Peters Knickle, Rocky River, OH (US); Brian David Holden, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 82 days.

(21) Appl. No.: 10/651,695

(22) Filed: Aug. 29, 2003

(65) Prior Publication Data

US 2004/0054065 A1    Mar. 18, 2004

Related U.S. Application Data

(60) Provisional application No. 60/411,467, filed on Sep. 16, 2002.

(51) Int. Cl.
*C08L 25/10* (2006.01)
*C08F 136/06* (2006.01)
*B60C 5/00* (2006.01)

(52) U.S. Cl. .............................. 525/333.2; 525/331.9; 525/241; 525/192; 525/342; 524/495; 524/492; 152/209.1

(58) Field of Classification Search ............ 525/337.9, 525/332.5, 232, 256, 241, 331.9, 333.2; 152/209.1
See application file for complete search history.

(56) References Cited

U.S. PATENT DOCUMENTS

| 5,284,898 | A |   | 2/1994 | Thise .................... 524/495 |
| 5,422,403 | A | * | 6/1995 | Hsu et al. ............... 525/342 |
| 5,432,232 | A | * | 7/1995 | Hattori et al. ............ 525/99 |
| 5,451,646 | A |   | 9/1995 | Castner .................. 426/137 |
| 5,798,408 | A | * | 8/1998 | Zanzig et al. ........... 524/505 |
| 6,013,718 | A |   | 1/2000 | Cabioch et al. ......... 524/506 |
| 6,071,995 | A | * | 6/2000 | Labauze ................. 524/269 |
| 6,090,880 | A | * | 7/2000 | Zimmer et al. ......... 524/492 |
| 6,573,412 | B1 | * | 6/2003 | Hogan et al. ........... 568/616 |
| 6,889,737 | B1 | * | 5/2005 | Weydert et al. ......... 152/525 |
| 2003/0078335 | A1 | * | 4/2003 | Hogan et al. ........... 524/492 |

FOREIGN PATENT DOCUMENTS

| EP | 641823       |   | 3/1995 |
| EP | 985 554 A1   | * | 3/2000 |
| JP | 2001-98115 A | * | 4/2001 |

OTHER PUBLICATIONS

JP 2001-98115 (abstract in English).*
KR 2001-17712 A, Mar. 5, 2001 (abstract in English only).*
EPO Search Report.

* cited by examiner

*Primary Examiner*—David W. Wu
*Assistant Examiner*—Rip Lee
(74) *Attorney, Agent, or Firm*—Henry C. Young, Jr.

(57) ABSTRACT

The invention relates to a tire having a tread of a rubber composition comprised of a composite of styrene/butadiene elastomer and functionalized styrene/butadiene elastomer containing an internal silanol and/or siloxy group therein with pendent silanol and/or alkoxy groups of a polymodal (e.g. bimodal) molecular weight distribution, together with at least 30 phr of cis 1,4-polybutadiene rubber and a dispersion in said rubber composition of precipitated silica aggregates and a coupling agent as a bis (3-triethoxysilylpropyl) polysulfide having an average of from only 2 to 2.5 sulfur atoms in its polysulfidic bridge to the exclusion of a bis (3-trialkoxysilylalkyl) polysulfide having an average of greater than 2.5, and particularly greater than 3, sulfur atoms in its polysulfidic bridge. In one aspect, said silica aggregates may be pre-treated to reduce said hydroxyl groups on their surface prior to blending with said silanol and/or siloxy functionalized elastomer. In one aspect, a carbon black contained in the rubber composition may be an electrically conductive carbon black.

20 Claims, No Drawings

TIRE WITH TREAD OF CIS 1,4-POLYBUTADIENE RICH RUBBER COMPOSITION WHICH CONTAINS A FUNCTIONAL STYRENE/BUTADIENE ELASTOMER, SILICA AND COUPLING AGENT

The Applicants hereby incorporate by reference prior U.S. Provisional Application Ser. No. 60/411,467, filed on Sep. 16, 2002.

FIELD OF THE INVENTION

The invention relates to a tire having a tread of a rubber composition comprised of a composite of styrene/butadiene elastomer and functionalized styrene/butadiene elastomer containing an internal silanol and/or siloxy group therein with pendent silanol and/or alkoxy groups of a polymodal (e.g. bimodal) molecular weight distribution, together with at least 30 phr of cis 1,4-polybutadiene rubber and a dispersion in said rubber composition of precipitated silica aggregates and a coupling agent as a bis (3-triethoxysilylpropyl) polysulfide having an average of from only 2 to 2.5 sulfur atoms in its polysulfidic bridge to the exclusion of a bis (3-trialkoxysilylalkyl) polysulfide having an average of greater than 2.5, and particularly greater than 3, atoms in its polysulfidic bridge. In one aspect, said silica aggregates may be pre-treated to reduce said hydroxyl groups on their surface prior to blending with said silanol and/or siloxy functionalized elastomer. In one aspect, a carbon black contained in the rubber composition may be an electrically conductive carbon black

BACKGROUND OF THE INVENTION

Tires are historically prepared with treads of a rubber composition which is comprised of various elastomers and particularly styrene/butadiene copolymer and a minor amount of cis 1,4-polybutadiene rubber.

Tire tread rubber compositions conventionally contain particulate reinforcing fillers which are normally carbon black and/or aggregates of precipitated silica. Such reinforcement fillers are will known to those having skill in such art.

When precipitated silica is used as a reinforcing filler, its reinforcing effect for the elastomer(s) is usually enhanced with the aid of a coupling agent which contains a moiety which is reactive with hydroxyl groups (e.g. silanol groups) contained on the surface of the precipitated silica and another moiety which is interactive with the elastomer(s), particularly with diene-based elastomers. Such use of coupling agents for precipitated silica aggregates is well known to those having skill in such art.

Sometimes, functionalized elastomers are taught for use with precipitated silicas.

For example, in U.S. Pat. No. 6,013,718, it has been proposed to provide a rubber composition including a functionalized diene polymer and silica in which the functionalized diene polymer bears a chain end as a silanol functional group or a polysiloxane block which has a silanol end. As a further example, in U.S. Pat. No. 6,071,995 such a proposal is made where a carbon black having silica fixed to its surface is suggested for use with a similar functionalized diene polymer.

In the description of the invention, the term "phr" relates to parts by weight of a particular ingredient per 100 parts by weight of rubber contained in a rubber composition.

The terms "rubber" and "elastomer" are used interchangeably unless otherwise indicated, and the terms "cure" and vulcanize" may be used interchangeably unless otherwise indicated.

SUMMARY OF THE INVENTION

In accordance with this invention, a tire is provided having at least one component of a rubber composition comprised of, based upon 100 parts by weight of elastomer (phr), (A) 100 phr of elastomers comprised of:

(1) about 30 to about 70 phr of a styrene/butadiene elastomer composite (SBR Composite) as a composite of styrene/butadiene copolymer rubber (SBR-1) and a functional styrene/butadiene copolymer rubber (SBR-2) which contains at least one silanol and/or siloxy group, with associated pendent hydroxyl and/or alkoxy groups, as a part of the (SBR-2) elastomer chain to thereby provide said elastomer with at least two segments thereof (SBR-2A and SBR-2B) with the silicon atom of said silanol and/or siloxy group between said segments, wherein said SBR Composite is thereby comprised of a polymodal (primarily bimodal) molecular weight configuration comprised about 35 to about 55 weight percent thereof of said (SBR-1) having a number average molecular weight (Mn) in a range of about 200,000 to about 300,000 and, correspondingly, about 65 to about 35 weight percent thereof of said (SBR-2) having a number average molecular weight (Mn) in a range of about 400,000 to 550,000; wherein said SBR Composite contains from zero to a maximum of ten weight percent of at least one additional styrene/butadiene copolymer segment (SBR-3) appended to said silicon atom having an number average molecular weight (Mn) of greater than 550,000, alternatively between 550,000 and about 650,000; and (2) at least 30, preferably at least 35 and in a range of from about 35 to about 50, phr of cis 1,4-polybutadiene rubber, and (3) from zero to about 15, alternately about 5 to about 15, phr of at least one additional diene-based elastomer, preferably selected from at least one of cis 1,4-polyisoprene rubber and, 3.4-polyisoprene rubber; and (B) about 35 to about 100, alternately about 50 to about 100, phr of particulate reinforcement comprised of:

(1) about 35 to about 85, alternately about 45 to about 85, phr of aggregates of precipitated silica comprised of a plurality of individual elementary silica particles, wherein said silicas particles contain hydroxyl groups thereon (e.g. silanol groups);

(2) from zero to about 15, alternately about 5 to about 15, phr of carbon black, (C) a coupling agent as bis(3-triethoxysilylpropyl) polysulfide having an average of from 2 to 2.5 connecting sulfur atoms in its polysulfidic bridge to the exclusive of a bis(3-trialkoxysilylalkyl) polysulfide having an average connecting sulfur atoms greater than 3 and particularly excluding an average in a range of from 3.5 to 4, in its polysulfidic bridge.

In practice, the functional styrene/butadiene elastomer (SBR-2) of the SBR Composite may, for example, be a silicon coupled styrene/butadiene copolymer elastomer of the general Formula (I):

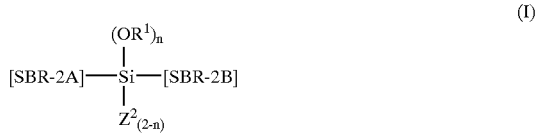

wherein said [SBR-2A] and [SBR-2B] are individual segments each having a bound styrene content in a range of from about 25 to about 35 percent, a vinyl 1,2-content in a range of about 50 to about 70 percent based on the butadiene component of the respective styrene/butadiene (SBR-2) copolymer, a Tg in a range of about −15° C. to about −30° C.; wherein the silicon (Si) atom is attached to a butadiene moiety of the respective (SBR-2A) and (SBR-2B); $R^1$ is selected from selected from hydrogen, methyl, ethyl, propyl, butyl and phenyl groups, preferably from hydrogen (thereby forming a pendent silanol group) or as a methyl or ethyl group (and therefore forming a pendent alkoxy group); and $Z^2$ is selected from an additional styrene/butadiene elastomer segment (SBR-3) having content and Tg values of said (SBR-1) and (SBR-2), an alkyl radical containing from 1 to about 18 carbon atoms, or an aromatic radical containing from 6 to about 12 carbon atoms, preferably from said alkyl radials and said aromatic radicals thereby yielding a linear silicon coupled elastomer; and where n is a value of from 1 to 2, preferably 2.

Accordingly, in one aspect of the invention, it is considered herein that said Formula (I) may be represented as a substantially linear silicon coupled elastomer (SBR-2) as Formula (IA) or (IB):

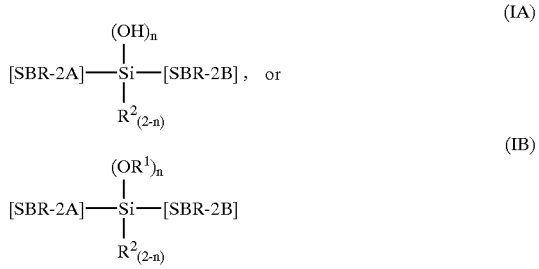

wherein $R^1$ is selected from methyl, ethyl, propyl, butyl, and phenyl radicals, preferably an ethyl radical and wherein n is a value in a range of from zero to 2, preferably 2.

Representative examples of $R^2$ radicals are radicals selected from, for example, isopropyl, t-butyl, phenyl and tolyl radicals.

In practice, it is, in general, considered herein that said (SBR-2A) and SBR-2B) are substantially equal in their individual physical characteristics.

The tire tread is referred to herein as being cis 1,4-polybutadiene rich because it contains a significantly greater than conventional amount of polybutadiene rubber for a tire tread, namely at least 30 phr and preferably at least 35 phr which is considered to be a relative large loading of polybutadiene rubber. In one aspect, it is considered herein that such large polybutadiene loading can be better accommodated by use of a branched high cis 1,4-polybutadiene rubber which has been found to be more processable in a rubber composition than conventional a straight chain cis 1,4-polybutadiene rubber.

In practice, therefore, the cis 1,4-polybutadiene rubber is preferably a branched cis 1,4-polybutadiene rubber having a cis 1,4-content of at least 96 percent and which is considered herein to contain branches of pendent polybutadiene groups along its molecular chain and therefore termed herein as a "branched" cis 1,4-polybutadiene rubber. Such branched cis 1,4-polybutadiene may be prepared by polymerizing 1,3-butadiene in accordance with U.S. Pat. No. 5,451,646 which is referenced herein in its entirety. In particular such branched high cis 1,4-polubutadiene rubber prepared by polymerizing 1,3-butadiene monomer in an organic solvent in the presence of (A) an organonickel compound as a nickel salt of a carboxylic acid, namely nickel octanoate, (B) an organoaluminum compound as a trialklylaluminum compound, namely triisobutyl aluminum (C) product of hydrogen fluoride and para-styrenated diphenylamine catalyst modifier to provide a cis 1,4-polybutadiene of reduced molecular weight (and thereby reduced Mooney (ML 1+4) viscosity).

In practice, for example, for such polymerization the para-styrenated diphenylamine and hydrogen fluouride are pre-reacted and the triisobutyl aluminum and nickel octanoate are brought together in the presence of the para-styrenated diphenylamine/hydrogen fluoride product, all in an organic solvent, and the 1,3-butadiene is polymerized in the presence of such catalyst complex. Such specialized polybutadiene desirably has a relatively low Mooney viscosity (ML 1+4) at 100° C. in its unvulcanized state in a range of about 35 to about 45. An example of such specialized cis 1,4-polybutadine is Budene 1280™ by The Goodyear Tire & Rubber Company.

In practice, the cis 1,4-polybutadiene rubber may be a specialized polybutadiene as a branched cis 1,4-polybutadiene rubber having a cis 1,4-content of at least 96 percent and which is considered herein to contains branches of pendent polybutadiene based groups along its molecular chain and therefore termed herein as a "branched" cis 1,4-polybutadiene rubber. Such branched cis 1,4-polybutadiene may be prepared by polymerizing 1,3-butadiene in accordance with U.S. Pat. No. 5,451,646 which is referenced herein in its entirety. In particular, and in accordance with U.S. Pat. No. 5,451,646, the 1,3-butadiene monomer is polymerized in an organic solvent in the presence of (a) an organonickel compound as a nickel salt of a carboxylic acid, namely nickel octanoate, (b) an organoaluminum compound as a trialklylaluminum compound, namely triisobutyl aluminum (c) hydrogen fluoride to in the presence of a para-styrenated diphenylamine catalyst modifier to provide a cis 1,4-polybutadiene of reduced molecular weight (and thereby reduced Mooney (ML 1+4) viscosity). In practice, for example, for such polymerization the para-styrenated diphenylamine and hydrogen fluouride are pre-reacted and the triisobutyl aluminum and nickel octanoate are brought together in the presence of said para-styrenated diphenylamine/hydrogen fluoride product, all in an organic solvent, and the 1,3-butadiene is polymerized in the presence of such catalyst complex. Such specialized polybutadiene desirably has a relatively low Mooney viscosity (ML 1+4) at 100° C. in its unvulcanized state in a range of about 35 to about 45. An example of such specialized cis 1,4-polybutadine is Budene 1280™ by The Goodyear Tire & Rubber Company.

In another aspect of the invention, it may also be desired to use a relative electrically conductive rubber reinforcing carbon black in order to enhance electrical conductivity of the rubber composition instead of more conventional rubber reinforcing carbon blacks.

It is to be appreciated that typical highly reinforcing rubber reinforcing carbon blacks, such as those used for tire treads, may have DBP (dibutyl phthalate) values (ASTM D2414) and Iodine values (ASTM D1510) in a range of, for example, about 100 to about 200 cm$^3$/100 g and in a range of about 90 to about 150 g/kg, respectively, particularly for use in tire treads. Representative of such highly reinforcing carbon blacks are, for example, carbon blacks having ASTM designations N110, N121 and N234, which are carbon blacks often used for tire tread rubber compositions.

For more electrically conductive carbon blacks, carbon blacks having a DBP value of at least 250 cm$^3$/100 g (e.g. in a range of from 250 to 600 cm$^3$/100 g) and an associated Iodine value of at least 500 g/kg (e.g. in a range of from 500 to 1050 g/kg) may be desired. Representative examples of carbon blacks considered herein to be relatively electrically conductive carbon blacks are, for example Corax XE-2™ from the Degussa Company having a reported DBP value of about 400 cm$^3$/100 g and an Iodine number of about 1000 g/kg; 23 MM™ from the 3M Company having a reported DBP value of about 300 cm$^3$/100 g and an Iodine value of about 600 g/kg; Ketjen EC600J™ and Ketjen ED300J™ from the AKZO Company having reported DBP values of about 550 and 360 cm$^3$/100 g, respectively and Iodine values of about 1040 and 800 g/kg respectively. Other examples of carbon blacks considered herein to be relatively electrically conductive for the purposes of this invention are, for example, Vulcan XC72™ and Black Pearls 2000™ from the Cabot Corporation. For example, see U.S. Pat. No. 6,331,576.

Therefore, in one aspect of this invention, the rubber composition contains from about 5 to about 15 phr of carbon black filler having a DBP value in a range of from about 100 to about 200 cm$^3$/100 g and an Iodine value in a range of from about 90 to about 150 g/kg.

However, it is preferred, where the rubber composition contains from 5 to about 15 phr of carbon black, including any carbon black which is a carrier for the coupling agent which may be, for example, an N330 carbon black, that from about 30 to about 100 weight percent of the total carbon black has a DBP value in a range of from 250 to about 600 cm$^3$/100 g and an Iodine value in a range of about 500 to about 1050 g/kg with the remainder of the carbon black, including any carbon black carrier for the coupling agent has a DBP value in a range of from 100 to 200 cm$^3$/100 g and an Iodine value in a range of from 90 to 150 g/kg.

Significant aspects of this invention include an inclusion of relatively high level of cis 1,4-polybutadiene rubber (e.g. preferably from 35 to 50 phr), particularly the aforesaid branched cis 1,4-polybutadiene rubber with its high cis 1,4-content of at least 96 percent and relatively low Mooney viscosity, together with the selective use of a bis(3-triethoxysilylpropyl) polysulfide having an average of only 2 to 2.5 connecting sulfur atoms in its polysulfidic bridge to the exclusion of such organosiloxy polysulfides having significantly greater connecting sulfur atom contents, all in combination with the required functional styrene/butadiene copolymer rubber containing the internal silicon atom with associated pendent hydroxyl and/or alkoxy groups.

One purpose of using the specialized polybutadiene, namely the aforesaid branched cis 1,4-polybutadene rubber, is to provide such polybutadiene rubber of a relatively lower Mooney ML(1+4) viscosity value in a range of about 35 to about 45 to thereby enhance its processability and enable the preparation of a relatively polybutadiene rubber-rich rubber composition, which contains at least 35 phr of the polybutadiene rubber, for the practice of this invention.

A representative example of said SBR Composite of styrene/butadiene copolymer rubber (SBR-1) and silicon coupled, pendent silanol and/or siloxane containing, styrene/butadiene elastomer (SBR-2) is contemplated to be T596™ from the Japan Synthetic Rubber (JSR) Company.

A purpose in restricting the connecting sulfur atom content of the bis(3-triethoxylsilylpropyl) polysulfide coupling agent to a maximum average connecting sulfur atoms in its polysulfidic bridge of 2.5 is to reduce or eliminate the presence of significant amounts of such organosiloxy polysulfides with significantly higher averages of connecting sulfur atoms and therefor reduce or eliminate a generation of free sulfur from such polysulfide on the premise that such disulfides are more resistant to breaking up into free sulfur atoms than such disulfides with a higher average number of connecting sulfur atoms in its polysulfidic bridge such as, for example, an average higher than 2.5 connecting sulfur atoms. Such purpose is to aid in enabling the inclusion in the rubber composition of a significant amount of the cis-1,4-polybutadiene-rich rubber preferably to a level of at least 35 phr. In such manner, then, less sulfur is presented to the rubber composition by the coupling agent to thereby interact with a diene based rubber, particularly the significant amount of the cis 1,4-polybutadiene rubber, in the rubber composition and thereby unnecessarily and inappropriately increasing its mixing viscosity, during the high shear mixing of the rubber composition at a temperature of, for example, in a range of from 140° C. to about 175° C.

In one aspect of the invention, the precipitated silica may be, prior to blending with said elastomer(s):

(A) pre-treated with an with an alkylsilane of the general Formula (III) prior to blending with said elastomer(s) and said coupling agent;

(B) pre-treated with a coupling agent of the general Formula (II), or (C) pre-treated with an organomercaptosilane of formula (IV), or (D) pre-treated with a combination of said alkylsilane of Formula (III), with (1) a coupling agent of Formula (II), and/or (2) said organomercaptosilane of Formula (IV), wherein said coupling agent of Formula (II) is represented as:

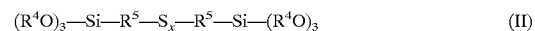

$$(R^4O)_3{-}Si{-}R^5{-}S_x{-}R^5{-}Si{-}(R^4O)_3 \quad \text{(II)}$$

wherein R$^4$ is an alkyl radical selected from at least one of methyl and ethyl radicals, preferably an ethyl radical, R$^5$is an alkylene radical having from 1 to 18 carbon atoms, preferably from 2 through 4 carbon atoms, and x is a value in a range of 2 to 8, with an average of from 2 to about 2.6 or from about 3.5 to about 4, preferably from 2 to 2.6;

wherein said alkylsilane of the general Formula (III) is represented as:

$$X_n{-}Si{-}R^6{}_{4-n} \quad \text{(III)}$$

wherein R$^6$ is an alkyl radical having from 1 to 18 carbon atoms, preferably from 1 through 4 carbon atoms; n is a value of from 1 through 3; X is a radical selected from the group consisting of halogens, preferably chlorine, and alkoxy radicals selected from methoxy and ethoxy radicals, and wherein said organomercaptosilane of the general Formula (IV) is represented as:

$$(X)_n(R^7O)_{3-n}—Si—R^8—SH \qquad (IV)$$

wherein X is a radical selected from a halogen, namely chlorine or bromine and preferably a chlorine radical, and from alkyl radicals having from one to 16, preferably from one through 4, carbon atoms, preferably selected from methyl, ethyl, n-propyl and n-butyl radicals; wherein $R^7$ is an alkyl radical having from one through 4 carbon atoms preferably selected from methyl and ethyl radicals and more preferably an ethyl radical; wherein $R^8$ is an alkylene radical having from one to 16, preferably from one through 4, carbon atoms, preferably a propylene radical; and n is an average value of from zero through 3, preferably zero.

A significant consideration for said pre-treatment of said silica is to reduce, or eliminate, evolution of alcohol during the mixing of the silica with said elastomer such as may be caused, for example, by reaction of, for example a bis(3-triethoxysilylpropyl) polysulfide coupling agent contained within the elastomer composition with hydroxy groups (e.g. silanol groups) contained on the surface of the silica.

A significant consideration of use of the said functionalized diene-based elastomer, namely said SBR Composite, as tire tread rubber composition, particularly where said precipitated silica is pre-treated with a coupling agent of Formula (II) and/or said with said alkylsilane of formula (III), is a reduction, or elimination, of evolution of alcohol during the mixing of the precipitated silica with said bis(3-triethoxysilylpropyl) polysulfide coupling agent with said SBR Composite and any additional diene-based elastomer insofar as the coupling agent is concerned which may be a consideration where it is desired that an alcohol is not released when mixing the respective ingredients with the respective elastomers, such as for example where it might be desired that alcohol is not thereby released into the atmosphere in a rubber product manufacturing facility such as, for example, a tire manufacturing plant. Thus the alcohol byproduct may be limited to and contained at a silica manufacturing, or a silica treatment, facility exclusive of a rubber product manufacturing facility.

By such practice of said pre-treatment of the silica prior to mixing with the rubber composition, a tire is provided which is comprised of a component of a rubber composition exclusive of any appreciable content of in situ formed alcohol.

Representative alkylsilanes of formula (II) for use in the practice of this invention are, for example, trichloromethylsilane, dichlorodimethylsilane, chlorotrimethylsilane, trimethoxymethylsilane, dimethoxydimethylsilane, methoxytrimethylsilane, trimethoxypropylsilane, trimethoxyoctylsilane, trimethoxyhexadecylsilane, dimethoxydipropylsilane, triethoxymethylsilane and diethoxydimethylsilane. Preferable organosilanes are dichlorodimethylsilane, chlorotrimethylsilane and hexamethyldisilazane.

Representative of organomercaptosilanes of formula (III) for use in the practice of this invention are, for example organomercaptosilanes as, for example, mercaptomethyltrimethoxysilane, mercaptoethyltrimethoxysilane, mercaptopropyltrimethoxysilane, mercaptomethyltriethoxysilane, mercaptoethyltripropoxysilane and mercaptopropyltriethoxysilane. Preferable organomercaptosilanes of formula (III) are mercaptopropyltriethoxysilane and mercaptopropyltrimethoxysilane.

In one aspect of the invention, as hereinbefore discussed, the precipitated silica may be treated with both an alkylsilane, as a hydrophobating agent, represented by formula (II) optionally with a bis(3-triethoxysilylpropyl) polysulfide coupling agent and alternatively with the organomercaptosilane of formula (III) whether by itself or in combination with said alkylsilane and/or coupling agent.

In practice of the invention, various diene-based elastomers (in addition to said functionalized diene-based elastomer) and said cis 1,4-polybutadiene rubber, may be used for tire tread rubber composition.

Such additional diene based elastomers may be, for example, homopolymers and copolymers of conjugated dienes such as for example isoprene and 1,3-butadiene and copolymers of such dienes with a vinyl aromatic compound such as styrene or alphamethyl styrene, preferably styrene.

Representative of such additional elastomers are, for example, cis 1,4-polyisoprene rubber (natural and synthetic), additional styrene/butadiene copolymer rubber (non-functionalized copolymer rubber prepared by aqueous emulsion or organic solvent polymerization other than the aforesaid SBR composite), styrene/isoprene/butadiene terpolyrner rubber, butadiene/acrylonitrile rubber, 3,4-polyisoprene rubber and isoprene/butadiene copolymer rubber.

In practice, the rubber composition may contain a tin and/or silicon coupled, preferably tin coupled, diene-based elastomer prepared by organic solvent polymerization in the presence of a suitable tin-based catalyst complex of at least one of isoprene and 1,3-butadiene monomers or of styrene together with at least one of isoprene and 1,3-butadiene monomers. Said tin and/or silicon coupled elastomers may be selected from, for example, styrene/butadiene copolymers, isoprene/butadiene copolymers, styrene/isoprene copolymers and styrene/isoprene/butadiene terpolymers. The preparation of tin and silicon coupled elastomers via organic solvent polymerization is well known to those having skill in such art.

It is readily understood by those having skill in the art that the rubber composition of the tire component for this invention would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention which is more primarily directed to the utilization of the aforesaid functionalized elastomer and specialized aggregates of precipitated silica for a tire tread rubber composition.

The tires can be built, shaped, molded and cured by various methods which will be readily apparent to those having skill in such art.

The invention may be better understood by reference to the following example in which the parts and percentages are by weight unless otherwise indicated.

EXAMPLE I

Mixtures of diene rubber compositions were prepared comprised of recipes shown in Table 1 as Samples A, B, C and D, with Sample A being a Control Sample.

Control Sample A utilized a blend of high vinyl polybutadiene (65 percent vinyl) extended with oil, cis 1,4-polybutadiene rubber, emulsion polymerization prepared styrene/butadiene rubber (E-SBR-1) extended with oil and cis 1,4-polyisoprene natural rubber, together with carbon black and silica obtained as Zeopol 8745™ from the J. M. Huber Company and a bis (3-triethoxysilylpropyl) polysulfide having an average connecting sulfur atoms in its polysulfide bridge in a range of from 2 to 2.5.

Sample B utilized a blend of cis 1,4-polybutadiene rubber, said (E-SBR-1) and an additional emulsion polymerization prepared styrene/butadiene rubber (E-SBR-2) extended with oil, together with said silica and coupling agent.

Sample C utilized an internal silanol and/or siloxy functionalized, bimodal molecular weight distribution styrene/butadiene rubber composite extended with oil and cis 1,4-polybutadiene rubber of restricted molecular weight range together with Zeosil 165GR™ from Rhodia and said coupling agent.

Sample D was similar to Sample C with differing amounts of the respective elastomers and Zeosil 165GR silica.

Conventional amounts of antidegradant(s) (para-phenylene diamine type), fatty acid, microcrystalline wax, and zinc oxide were used.

Significant aspects of the rubber blends are exemplified in the following Table 1.

TABLE 1

| Material | Control Sample A | Sample B | Sample C | Sample D |
|---|---|---|---|---|
| First Non-Productive Mix Stage (about 165 to 170° C.) | | | | |
| Functional SBR rubber[1] | 0 | 0 | 96.25 | 89.37 |
| High vinyl polybutadiene rubber[2] | 60 | 0 | 0 | 0 |
| Cis 1,4-polybutadiene rubber[3] | 20 | 40 | 30 | 35 |
| E-SBR-1 rubber[4] | 27.5 | 41.25 | 0 | 0 |
| E-SBR-2 rubber[5] | 0 | 41.25 | 0 | 0 |
| Natural rubber[6] | 10 | 0 | 0 | 0 |
| Zeopol 8745 silica[7] | 76 | 76 | 0 | 0 |
| Zeosil 165GR silica[8] | 0 | 0 | 75 | 78 |
| Coupling agent[9] | 12 | 12 | 12 | 12 |
| Second Non-Productive Mix Stage (about 165 to 170° C.) | | | | |

This is simply a mixing stage without addition of ingredients, sometimes referred to as a re-mill stage, although the mixing is conducted in an internal rubber mixer and not on rubber mixing mills Productive Mix Stage (about 110° C.)

| Sulfur | 2 | 2 | 2 | 2 |
|---|---|---|---|---|
| Accelerators[10] | 3.7 | 3.7 | 3.7 | 3.7 |

[1]Functional solution polymerization prepared styrene/butadiene composite having a bound styrene of about 26 percent based on the elastomer composite, a vinyl 1,2-content of about 67 percent based on the butadiene component of the elastomer, and Tg of about −26° C. and a Mooney (1 + 4) viscosity at 100° C. of about 37, functionalized by containing internal silanol units and of a bimodal molecular weight distribution, as hereinbefore described, obtained as T596 from the JSR (Japan Synthetic Rubber) Corporation, oil extended with 37.5 parts by weight of oil per 100 parts of the elastomer (14.5 parts by weight oil for the 38.5 parts elastomer) and reported in the Table 1 rubber plus oil.
[2]High vinyl polybutadiene rubber having a vinyl content of about 65 percent containing 20 phr of oil and reported in Table 1 as rubber plus oil.

TABLE 1-continued

| Material | Control Sample A | Sample B | Sample C | Sample D |
|---|---|---|---|---|

[3]Nonbranched, linear, cis 1,4-polybutadiene rubber as Budene 1207 from The Goodyear Tire and Rubber Company having a Mooney (ML 1 + 4) viscosity at 100° C. in its unvulcanized state of about 50 to about 60.
[4]Emulsion polymerization prepared styrene/butadiene rubber having about 40 percent bound styrene and containing 37.5 phr of oil and reported in Table 1 as rubber plus oil.
[5]Emulsion polymerization prepared styrene/butadiene rubber having about 23.5 percent bound styrene and containing 37.5 phr of oil and reported in Table 1 as rubber plus oil.
[6]Cis 1,4-polyisoprene natural rubber
[7]Silica as Zeopol 8745 from J. M. Huber Corporation
[8]Silica as Zeosil 165GR from Rhodia understood to have a CTAB value of about 145 to 175 $m^2/g$.
[9]Coupling agent as X266S ™ as a bis (3-triethoxysilylpropyl) polysulfide containing from about 2 to about 2.5 sulfur atoms in its polysulfidic bridge (which may be referred to herein as a "disulfide") on a carbon black carrier in a 50/50 weight ratio from Degussa-Hulls and reported in the Table 1 as the composite of coupling agent and carbon black.
[10]Accelerators as, variously, a sulfenamide together with diphenyl guanidine or tetramethyl thiuram disulfide The prepared rubber compositions were cured at a temperature of about 160° C. for about 14 minutes and the various physical properties (rounded numbers are reported herein) as reported in the following Table 2.

TABLE 2

| Properties | Control Sample A | Sample B | Sample C | Sample D |
|---|---|---|---|---|
| Stress/strain | | | | |
| 100% modulus (MPa) | 1.77 | 1.71 | 1.82 | 1.89 |
| 300% modulus (MPa) | 10.26 | 7.41 | 10.53 | 10.07 |
| Hardness | | | | |
| 23° C. | 62.8 | 65.9 | 64.1 | 64.4 |
| 100° C. | 58.3 | 59.3 | 59.5 | 60.2 |
| Rebound | | | | |
| 23° C. | 42.7 | 37.3 | 31.5 | 39.2 |
| 100° C. | 66.6 | 60.8 | 63.9 | 63.5 |
| DIN abrasion, Rel. Vol. Loss (cc) | 142 | 129 | 148 | 111 |
| Tan Delta | | | | |
| 0° C., 11 Hertz | 0.193 | 0.165 | 0.326 | 0.220 |
| Dynamic Stiffness | | | | |
| E' at −25° C. and 11 Hertz | 1.01 E+08 | 1.32 E+08 | 3.58 E+08 | 1.85 E+08 |

From Table 2 it is seen that Sample D, which contains the functional styrene/butadiene copolymer rubber in combination with a high content of cis 1,4-polybutadiene rubber (ratio of the polybutadiene to functional SBR is 35/65) and the Zeosil 165GR silica, provides a tread with improved all-season weather performance as hereinafter discussed.

In particular, Sample D is seen to provide a 14 percent and 33 percent increase in tan delta at 0° C. as compared to Control Sample A and Sample B, respectively.

In particular, Sample D is seen to provide a 22 percent and 14 percent improved abrasion resistance as compared to Control Sample A and Sample B, respectively.

The significant increase in the tan delta property for Sample D is indicative of improved wet traction for a tire having a tread of such rubber composition.

The significant improvement in abrasion resistance for Sample D (lower value indicates less volume loss and is therefore better resistance to abrasion) is indicative improved resistance to tread wear for a tire having a tread of such rubber composition.

A particular significance of the simultaneous improvement of both indicative wet traction (the tan delta property) and indicative resistance to tread wear (the abrasion resistance property) is that such phenomenon is expected to be difficult to achieve because it is normally expected that an improvement in wet traction for a tire tread (the tan delta property) typically results in a reduction in its resistance to tread wear (the abrasion resistance property), and visa versa and therefor are usually considered as trade-offs.

Indeed, such expected trade-off of such property values is exemplified in Sample C which shows a very high tan delta value of 0.326 which is indicative of excellent wet traction for a tire tread but a also shows an expected worse resistance to abrasion (148 cc) as compared to Control Sample A and Sample B as well as Sample D.

It can further be seen from Table 2 that the dynamic stiffness (E' at −25° C.) of Sample C is significantly higher than Control Sample A and Samples B and D and thus is a stiffer rubber composition. A reduced dynamic stiffness property at −25° C., such as indicated for Tires A, B and C, reflects a softer rubber composition and is indicative of better snow performance, namely tire traction acceleration and braking, for a tire tread of such rubber composition in which a lower dynamic stiffness property is considered as being better.

Thus Example demonstrates that Sample D provides an indicative improved all-season performance for a tire tread of such rubber composition. This is considered herein to be achieved to utilization of the functional styrene/butadiene elastomer in combination with the high level (35 phr) of cis 1,4-polybutadiene rubber, silica and coupling agent having a maximum average of 2.5 connecting sulfur atoms in its polysulfidic bridge.

Pneumatic tires A through D were prepared having treads of rubber compositions corresponding to Control Sample A and Samples B through D.

Rolling resistance and stopping distance ratings of the tires were normalized to a value of 100 for the Control A tire and comparative values for tire Samples B through D are reported in the following Table 3, except for stopping values for Tires B and C which were not obtained and simply reported as "N/A".

TABLE 3

| Properties | Control Sample A | Sample B | Sample C | Sample D |
|---|---|---|---|---|
| RR rating | 100 | 91 | 96 | 100 |
| Stopping distance rating | | | | |
| Wet pavement | 100 | N/A | N/A | 104 |
| Dry pavement | 100 | N/A | N/A | 103 |

From Table 3, for Tire D, it is seen that the aforesaid indicative combination of improved wet and dry traction while maintaining low rolling resistance as compared to Control Tire Sample A is obtained for the tire. This improvement is considered herein to be an unexpected result as these tire performance characteristics, namely rolling resistance and traction, as hereinbefore noted are normally trade-offs to each other, or contradictory in direction. That is, if tread traction is improved, it is usually at the expense of the rolling resistance property.

While certain representative embodiments and details have been shown for the purpose of illustrating the invention, it will be apparent to those skilled in this art that various changes and modifications may be made therein without departing from the spirit or scope of the invention.

What is claimed is:

1. A tire having at least one component of a rubber composition comprised of,
   (A) 100 phr of elastomers comprised of:
      (1) about 30 to about 70 phr of a styrene/butadiene elastomer composite (SBR Composite) as a composite of styrene/butadiene copolymer rubber (SBR-1) and a functional styrene/butadiene copolymer rubber (SBR-2) which contains at least one silanol and/or siloxy group, with associated pendent hydroxyl and/or alkoxy groups, as a part of the (SBR-2) elastomer chain to thereby provide said elastomer with at least two segments thereof (SBR-2A and SBR-2B) with the silicon atom of said silanol and/or siloxy group between said segments, wherein said SBR Composite is thereby comprised of a polymodal molecular weight distribution comprised about 35 to about 55 weight percent thereof of said (SBR-1) having a number average molecular weight (Mn) in a range of about 200,000 to about 300,000 and, about 65 to about 35 weight percent thereof of said (SBR-2) having a number average molecular weight (Mn) in a range of about 400,000 to 550,000; wherein said SBR Composite contains from zero to a maximum of ten weight percent of at least one additional styrene/butadiene copolymer segment (SBR-3) appended to said silicon atom having an number average molecular weight (Mn) of greater than 550,000; and based on 100 parts by weight of elastomer (phr)
      (2) at least 30 phr of cis 1,4-polybutadiene rubber, and
      (3) from zero to about 15 phr of at least one additional diene-based elastomer selected from cis 1,4-polyisoprene rubber, 3,4-polyisoprene rubber and trans 1,4-polybutadiene rubber, and
   (B) about 35 to about 100 phr of particulate reinforcement comprised of:
      (1) about 35 to about 85 phr of aggregates of precipitated silica comprised of a plurality of individual elementary silica particles, wherein said silicas particles contain hydroxyl groups thereon;
      (2) from zero to about 15 phr of carbon black,
   (C) a coupling agent as bis(3-triethoxysilylpropyl) polysulfide having an average of from 2 to 2.5 connecting sulfur atoms in its polysulfidic bridge to the exclusion of a bis(3-trialkoxysilylalkyl) polysulfide having an average connecting sulfur atoms greater than 3 in its polysulfidic bridge.

2. The tire of claim 1 wherein said rubber composition contains from 35 to about 55 phr of said 1,4-polybutadiene rubber and about 5 to about 15 phr of said carbon black.

3. The tire of claim 2 wherein said rubber composition contains from 5 to about 15 phr of at least one of said additional elastomers.

4. The tire of claim 1 wherein said functional styrene/butadiene copolymer rubber (SBR-2) of the SBR Composite is silicon coupled styrene/butadiene copolymer elastomer of the general Formula (I):

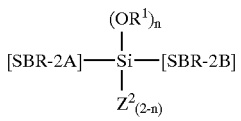

wherein said [SBR-2A] and [SBR-2B] are individual segments each having a bound styrene content in a range of from about 25 to about 35 percent, a vinyl 1,2-content in a range of about 50 to about 70 percent based on the butadiene component of the respective styrene/butadiene (SBR-2) copolymer, a Tg in a range of about −15° C. to about −30° C.; wherein the silicon (Si) atom is attached to a butadiene moiety of the respective (SBR-2A) and (SBR-2B); $R^1$ is selected from selected from hydrogen, methyl, ethyl, propyl, butyl or phenyl groups; and $Z^2$ is selected from an additional styrene/butadiene elastomer segment (SBR-3) having bound styrene and vinyl 1,2-content and Tg values of said (SBR-1) and (SBR-2), an alkyl radical containing from 1 to about 18 carbon atoms, or an aromatic radical containing from 6 to about 12 carbon atoms; and where n is a value of from 1 to 2.

5. The tire of claim 4 wherein $R^1$ is selected from hydrogen, methyl and ethyl groups; $Z^2$ is selected from an additional styrene/butadiene elastomer segment (SBR-3), an alkyl radical containing from 1 to about 18 carbon atoms, or an aromatic radical containing from 6 to about 12 carbon atoms.

6. The tire of claim 1 wherein said (SBR-2) elastomer is represented as Formula (IA):

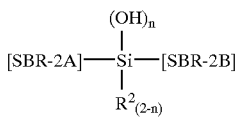

wherein $R^2$ is a radical selected from isopropyl, t-butyl, phenyl or tolyl radicals and n is a value in a range of from 1 to 2.

7. The tire of claim 6 wherein n is 2.

8. The tire of claim 1 wherein the (SBR-2) elastomer is represented as Formula (IB):

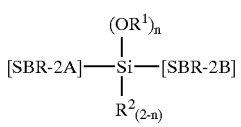

wherein $R^1$ is an ethyl radical and $R^2$ is a radical selected from isopropyl, t-butyl, phenyl or tolyl radicals and n is a value in a range of from 1 to 2.

9. The tire of claim 8 wherein n is 2.

10. The tire of claim 1 wherein said cis 1,4-polybutadiene rubber is a branched cis 1,4-polybutadiene rubber having a cis 1,4-content of at least 96 percent which contains branches of pendant polybutadiene groups along its molecular chain.

11. The tire of claim 10 therein said branched cis 1,4-polybutadiene is prepared by polymerizing 1,3-butadiene in an organic solvent in the presence of nickel octanoate, triisobutyl aluminum and the product of hydrogen fluoride para-styrenated diphenylamine and wherein said branched cis 1,4-polybutadiene has a Mooney viscosity (ML 1+4) at 100° C. in its unvulcanized state in a range of about 35 to about 45.

12. The tire of claim 1 wherein said precipitated silica is, prior to blending with said elastomer(s):
(A) pre-treated with an with an alkylsilane of the general Formula (III) prior to blending with said elastomer(s) and said coupling agent;
(B) pre-treated with a coupling agent of formula (II);
(C) pre-treated with an organomercaptosilane of formula (IV), or
(D) pre-treated with a combination of said alkylsilane of Formula (III) with
(1) said coupling agent of the general Formula (II) and/or
(2) said organomercaptosilane of Formula (IV), wherein said coupling agent of the general Formula (II) is represented as:

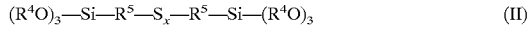

wherein $R^4$ is an alkyl radical selected from at least one of methyl and ethyl radicals, $R^5$ is an alkylene radical having from 1 to 18 carbon atoms, and x is a value in a range of 2 to 3, with an average of from 2 to about 2.6 ;

wherein said alkylsilane of the general Formula (III) is represented as:

wherein $R^6$ is an alkyl radical having from 1 to 18 carbon atoms, n is a value of from 1 through 3; X is selected from chlorine, methoxy or ethoxy radicals, and wherein said organomercaptosilane of the general Formula (IV) is represented as:

wherein X is a radical selected from chlorine, bromine and from alkyl radicals having from 1 to 4 carbon atoms; wherein $R^7$ is an alkyl radical having from 1 to 4 carbon atoms; wherein $R^8$ is an alkylene radical having from 1 to 4, carbon atoms; and n is an average value of from 0 through 3.

13. The tire of claim 12 wherein, for said Formula (IV), X is chlorine and $R^7$ is selected from methyl and ethyl radicals.

14. The tire of claim 12 wherein, for said Formula (IV), $R^7$ is an ethyl radical and n is zero.

15. The tire of claim 12 wherein said alkylsilanes of formula (III) are selected from at least one of the group consisting of trichloromethylsilane, dichlorodimethylsilane, chlorotrimethylsilane, trimethoxymethylsilane, dimethoxydimethylsilane, methoxytrimethylsilane, trimethoxypropylsilane, trimethoxyoctylsilane, trimethoxyhexadecylsilane, dimethoxydipropylsilane, triethoxymethylsilane and diethoxydimethylsilane.

16. The tire of claim 12 wherein said organomercaptosilanes of formula (IV) are selected from at least one of the group consisting of mercaptomethyltrimethoxysilane, mercaptoethyltrimethoxysilane, mercaptopropyltrimethoxysilane, mercaptomethyltriethoxysilane, mercaptoethyltripropoxysilane, and mercaptopropyltriethoxysilane.

17. The tire of claim 2 wherein said particulate reinforcement is present in an amount of from 50 to about 100 phr, said carbon black is present in amount of from about 5 to about 15 phr, said precipitated silica is present in an amount of from 45 to about 85 phr, and wherein about 30 to about 100 weight percent of said carbon black has a DBP value in a range of from 250 to about 600 cm$^3$/100 g and an Iodine value in a range of about 500 to about 1050 g/kg with the remainder of the carbon black having a DBP value in a range of from 100 to 200 cm$^3$/100 g and an Iodine value in a range of from 90 to 150 g/kg.

18. The tire of claim 12 wherein said tire is comprised of a component of a rubber composition exclusive of any appreciable content of in situ formed alcohol.

19. The tire of claim 13 wherein said tire is comprised of a component of a rubber composition exclusive of any appreciable content of in situ formed alcohol.

20. The tire of claim 18 wherein said component is a tire tread.

* * * * *